US007110569B2

(12) United States Patent
Brodsky et al.

(10) Patent No.: US 7,110,569 B2
(45) Date of Patent: Sep. 19, 2006

(54) VIDEO BASED DETECTION OF FALL-DOWN AND OTHER EVENTS

(75) Inventors: Tomas Brodsky, Croton-on-Hudson, NY (US); Serhan Dagtas, Little Rock, AR (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 591 days.

(21) Appl. No.: 10/188,735

(22) Filed: Jul. 3, 2002

(65) Prior Publication Data

US 2003/0058341 A1    Mar. 27, 2003

Related U.S. Application Data

(60) Provisional application No. 60/325,399, filed on Sep. 27, 2001.

(51) Int. Cl.
  *G06K 9/00* (2006.01)
  *H04N 5/225* (2006.01)
(52) U.S. Cl. .................................. 382/103; 348/169
(58) Field of Classification Search ............... 382/118, 382/236, 107, 149, 164, 181; 340/541; 348/169
  See application file for complete search history.

(56) References Cited

U.S. PATENT DOCUMENTS

| | | | | |
|---|---|---|---|---|
| 5,764,803 A | * | 6/1998 | Jacquin et al. | 382/236 |
| 5,774,591 A | * | 6/1998 | Black et al. | 382/236 |
| 5,802,220 A | * | 9/1998 | Black et al. | 382/276 |
| 6,049,281 A | * | 4/2000 | Osterweil | 340/573.4 |
| 6,212,510 B1 | * | 4/2001 | Brand | 706/62 |
| 6,292,575 B1 | * | 9/2001 | Bortolussi et al. | 382/118 |
| 6,411,328 B1 | * | 6/2002 | Franke et al. | 348/149 |
| 6,614,348 B1 | * | 9/2003 | Ciccolo et al. | 340/541 |
| 6,678,413 B1 | * | 1/2004 | Liang et al. | 382/181 |
| 6,681,032 B1 | * | 1/2004 | Bortolussi et al. | 382/118 |
| 2001/0043721 A1 | * | 11/2001 | Kravets et al. | 382/107 |
| 2002/0044682 A1 | * | 4/2002 | Weil et al. | 382/154 |
| 2002/0048388 A1 | * | 4/2002 | Hagihara et al. | 382/107 |
| 2002/0136448 A1 | * | 9/2002 | Bortolussi et al. | 382/164 |
| 2003/0058111 A1 | * | 3/2003 | Lee et al. | 340/573.1 |

* cited by examiner

*Primary Examiner*—Kanjibhai Patel
*Assistant Examiner*—ONeal R. Mistry

(57) ABSTRACT

A method for detecting the occurrence of a specific event is provided. The method includes: capturing image data of a scene; detecting and tracking an object of interest in the image data; analyzing features of the object of interest; comparing the analyzed features with predetermined criteria indicative of the specific event; and determining whether the specific event has occurred based on the comparison. The method is particularly useful in the monitoring of the elderly where the specific event is selected from a list comprising a fall-down, stagger, and panic gesturing.

23 Claims, 2 Drawing Sheets

VIDEO BASED DETECTION OF FALL-DOWN AND OTHER EVENTS

CROSS REFERENCE TO RELATED APPLICATIONS

This application claims the benefit of earlier filed provisional application Ser. No. 60/325,399 filed Sep. 27, 2001, the contents of which is incorporated by its reference.

BACKGROUND OF THE INVENTION

1. Field of the Invention

The present invention relates generally to computer vision, and more particularly, to video based detection of specific events, such as a fall-down event.

2. Prior Art

Video based event detection has been approached in a number of ways in the prior art. One such way has been to analyze object trajectories to extract events like "person entered/exited" or "person deposited an object." Simple motions such as "person walking" or "person running" have been learned and recognized from spatio-temporal motion templates. Example representations include motion history images, which capture recent object motion, and optical flow measurements. Probabilistic techniques such as Hidden Markov models (HMMs) and Bayesian nets have also been used extensively to recognize complex motion patterns and to learn and recognize human activities. Furthermore, invariance to changes in viewpoint has been studied and action recognition from multiple viewpoints has been analyzed in the prior art.

In the current state of the art, simple events (person entering a room) can be recognized well and without constraints. More complicated events/motions (person sitting on a chair) can either be recognized from a single viewpoint, or from multiple representations for multiple views of the event. However, current systems do not address the large amount of variation in appearance of certain events, such as a person falling down. That is, similar events, which can be performed in a great number of ways, cannot be consistently detected by the methods of the prior art. Other events that can be similarly classified include, but are not limited to, staggering and wild (panic) gestures (which can also be a visual way of calling for help).

Therefore, there is a need in the art for a method and apparatus for consistently detecting such events.

SUMMARY OF THE INVENTION

Therefore it is an object of the present invention to provide a method and apparatus for consistent video based detection of specific events, such as a fall-down and other similar events, that overcome the disadvantages associated with the prior art.

Accordingly, a method for detecting the occurrence of a specific event is provided. The method comprising: capturing image data of a scene; detecting and tracking an object of interest in the image data; analyzing features of the object of interest; comparing the analyzed features with predetermined criteria indicative of the specific event; and determining whether the specific event has occurred based on the comparison. Preferably, the specific event is selected from a list comprising a fall-down, stagger, and panic gesturing.

The detecting preferably comprises segmenting the image data into at least one moving object and background objects, the at least one moving object being the object of interest.

The object of interest is preferably a person in which case the detecting preferably further comprises learning and recognizing a human shape; and detecting a feature of the moving object indicative of a person. Preferably, the detecting of a feature of the moving object indicative of a person comprises detecting a face on the moving object.

Preferably, the analyzing comprises analyzing one or more of a temporal sequence of the object of interest, a motion characteristics of the object of interest, and a trajectory of the object of interest. Where the specific event is a fall-down, the predetermined criteria indicative of the fall-down preferably comprises at least one of: whether the temporal sequence indicates a transition from an upright pose to a lying pose for the object of interest; whether the motion characteristics indicates a downward motion within a predetermined time period for the object of interest; and whether there is an abrupt change in the trajectory for the object of interest. Where the specific event is a stagger, the predetermined criteria indicative of the stagger comprises at least one of: whether the temporal sequence indicates a back and forth motion for the object of interest; whether the motion characteristics indicates an irregular motion for the object of interest; and whether there is an some abruptness in the trajectory for the object of interest without significant changes in body pose. Where the specific event is a panic gesture, the predetermined criteria indicative of the panic gesture comprises at least one of: whether the temporal sequence indicates a periodic motion in a particular region of the object of interest; and whether the motion characteristics indicates a fast irregular motion in the particular region of the object of interest.

The determining step preferably comprises assigning a factor indicative of how well each of the analyzed features comply with the predetermined criteria indicative of the specific event and applying an arithmetic expression to the factors to determine a likelihood that the specific event has occurred.

Also provided is an apparatus for detecting the occurrence of a specific event. The apparatus comprising: at least one camera for capturing image data of a scene; a memory for storing predetermined criteria indicative of the specific event; and a processor for analyzing the captured image data to: detect and track an object of interest in the image data; analyze features of the object of interest; compare the analyzed features with the predetermined criteria indicative of the specific event; and determine whether the specific event has occurred based on the comparison.

Also provided are a computer program product for carrying out the methods of the present invention and a program storage device for the storage of the computer program product therein.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 1:
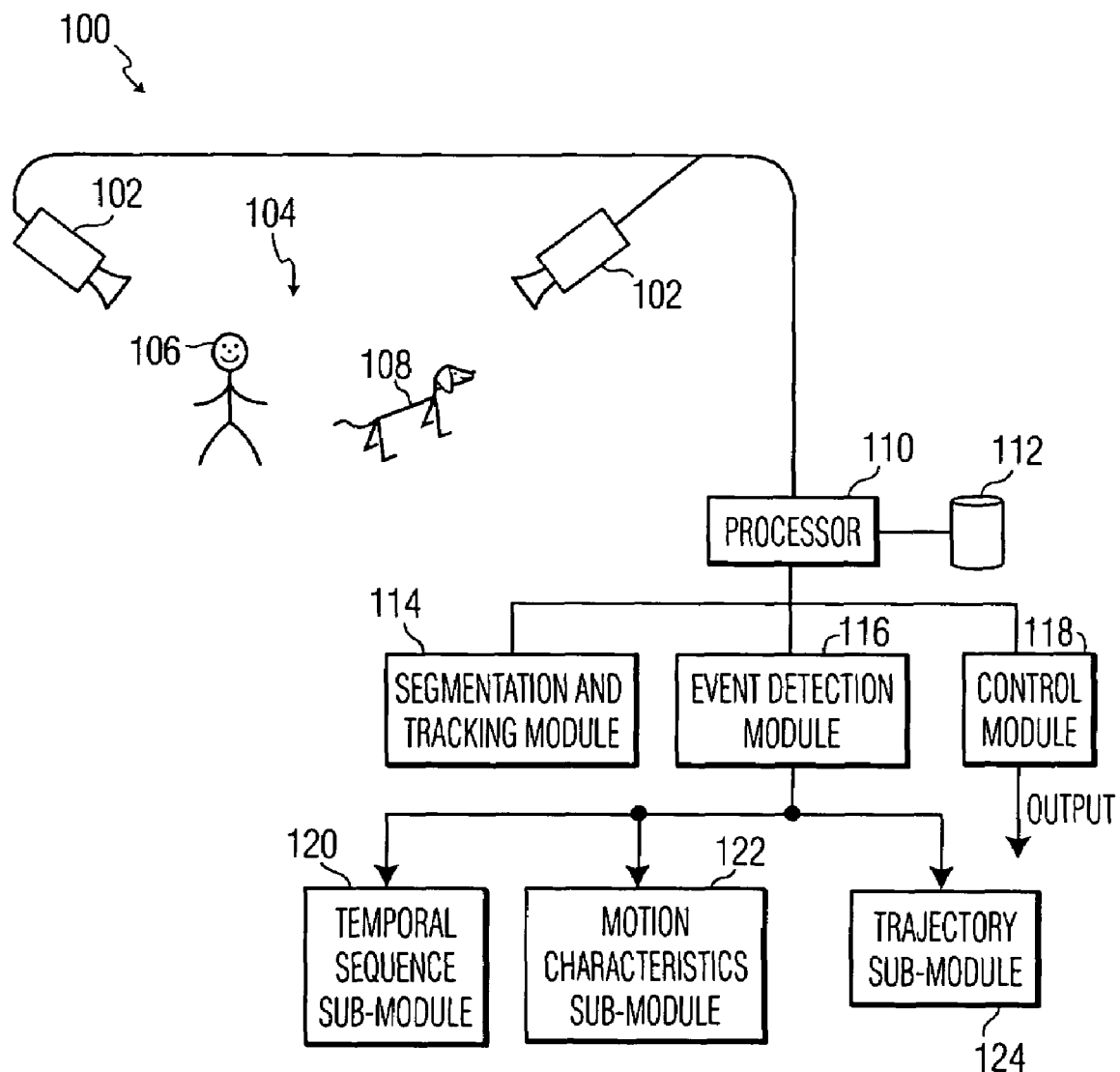
FIG. 1 illustrates a general schematic of the apparatus of the present invention.

Although this invention is applicable to numerous and various types of events, it has been found particularly useful in the environment of detecting fall-down events, staggering events, and wild (panic) gestures. Therefore, without limiting the applicability of the invention to detecting such events, the invention will be described in such environment.

The methods and apparatus of the present invention are particularly suited to detect certain events that are useful in an elderly monitoring system, such as that disclosed in co-pending U.S. application, Ser. No. 10/189,272, the disclosure of which is incorporated herein by its reference. Among the most important events for an elderly monitoring system are "falling-down," "staggering," and "wild gesturing". There are significant variations in appearance of these events, because, for example, a person may fall down in many different ways. In addition, the events appear differently from different viewpoints. In the elderly monitoring system, several cameras are preferably placed in a residence to monitor the activities of an elderly person—the goal is to raise alarms if the person falls, staggers, or simply does not move for a long period of time. An important part of the system is detection of the potentially dangerous events, such as a "fall down."

Instead of looking for numerous types of events, the methods and apparatus will preferably concentrate on detecting a few important events, such as falling down, staggering, and wild (panic) gestures. That is, the methods and apparatus will detect specific events so as to be "tuned" for each event of interest. For each event, its salient characteristics will be predetermined and event descriptions derived in terms of features, such as temporal sequences, motion characteristics, and trajectory. Those skilled in the art will appreciate that the methods and apparatus of the present invention are robust to changes in viewpoint and to partial occlusion, because viewpoint independent characteristics are preferred and used whenever possible.

The methods and apparatus of the present invention can be used as a stand-alone system or preferably as a component of a larger monitoring system, such as the elderly monitoring system discussed above. The larger monitoring system often detects and extracts moving regions corresponding to people. The methods and apparatus will preferably make use of such and use additional features extracted from the images to detect specific events of interest. Example features include object trajectory (i.e., position, speed, smoothness of motion, etc.), estimates of local motion (e.g., optical flow or motion energy receptors), object size and shape, as well as 3D position and height estimates wherever available (preferably from multiple views of the person).

Although, the fall-down event is discussed in detail, a similar approach is preferred for other events, such as "staggering" or "wild gesturing." In general, there are a number of salient features of the fall-down event:

temporal sequence: a fall-down is a transition from an upright pose to a lying pose or partially lying pose.

motion characteristics: a fall-down is a fast, downward motion.

a fall-down has an abrupt trajectory change.

One or more, and preferably, all of these features are considered at the same time, in order to detect a wide range of fall-down events and to distinguish true falls from other events. For example, "lying-down" is an event similar to "fall-down", but the motion is slower and less abrupt.

An overview of an apparatus for carrying out the methods of the present invention will now be described with reference to FIG. 1, the apparatus being generally referred to by reference numeral 100. The apparatus 100 comprises at least one camera 102. Although a single camera 102 can be used in the methods and apparatus of the present invention, information from multiple cameras 102, when available, is preferably combined and events derived from multiple views. The cameras 102 are preferably fixed but may also be capable of panning, tilting, and zooming, the control of which is well known in the art. Furthermore, it is preferred that the cameras 102 are video cameras and capture digital video image data of a scene 104, such as a room, including objects therein, such as humans 106, pets 108, and stationary objects (not shown). However, analog cameras 102 may also be used if their output is converted to a digital format for further use in the method.

The output from the cameras 102 input a processor 110, having a memory 112 operatively connected thereto. The processor 110 preferably has several modules operatively connected thereto for carrying out the tasks associated with the methods of the present invention. Each of the modules is preferably in the form of a set of instructions for carrying out their corresponding tasks. A first module 114 provides a segmentation and tracking of objects in the image data. A second module 116 provides an analysis of certain features of the objects in the image data for detection of a specific event and determines the likelihood of an occurrence of the specific event based on the analysis. A third module 118, is preferably used to output a result of the detection, for instance, to a remote central monitoring station (not shown).

The methods of the present invention, including a more detailed discussion of the modules 114, 116, 118, will now be discussed with reference to FIGS. 1–3.

Segmentation and Tracking

Figure 2:
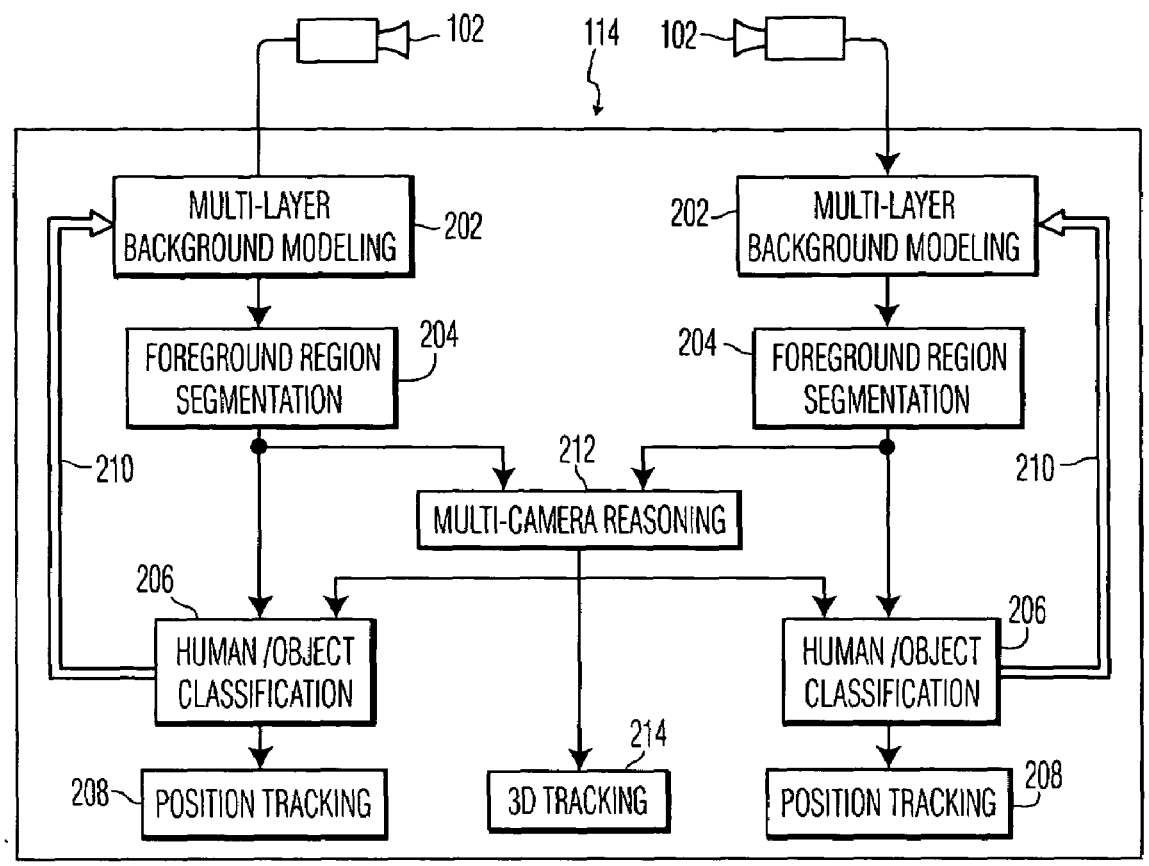
FIG. 2 illustrates a more detailed schematic of the segmentation and tracking module of FIG. 1.
Figure 3:
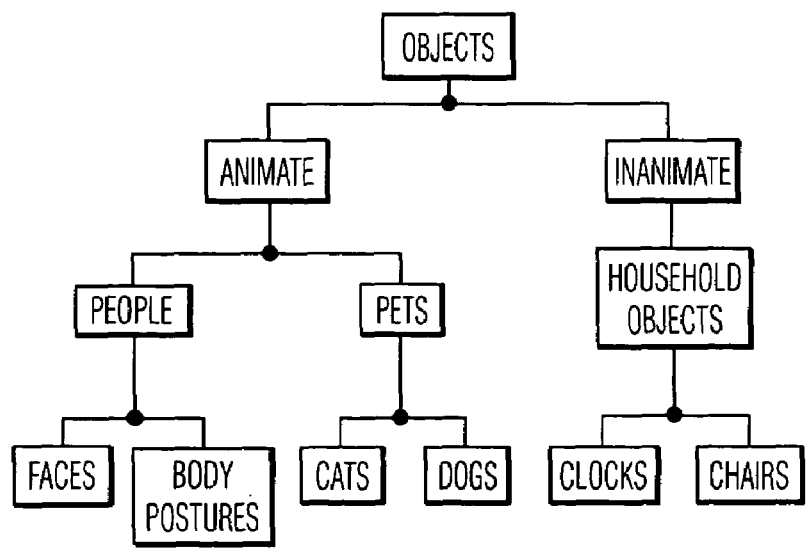
FIG. 3 illustrates a hierarchy of classification classes used in a preferred implementation of the classification of humans and/or objects in the image data.

Referring first to FIG. 2, after image data has been captured for a particular scene, relevant objects have to be extracted from raw video. The extraction of relevant objects from the image data preferably involves two processes: segmentation locates objects of interest in individual images, and tracking follows-the objects across images. In the preferred implementation of the methods and apparatus of the present invention, the primary objects of interest are humans. However, those skilled in the art will appreciate that other objects may also be of interest, such as objects that people interact with, such as pets and furniture.

Segmentation detects people in the image data scene, for example using a method called background subtraction, which segments the parts of the image corresponding to moving objects. Tracking tracks the regions in the image. Real-time detection of humans typically involves either foreground matching or background subtraction. Foreground matching is well known in the art, such as that disclosed in Gavrila et al., *Real-time Object Detection for Smart Vehicles,* Proc. International Conf. on Computer Vision, I:87–93, 1999. Background subtraction is also well known in the art, such as that disclosed in Wren et al., *Real-time tracking of the human body,* IEEE Trans., Pattern Analysis and Machine Intelligence, 19(7), 780–785, 1997. Human shapes can be detected directly by some form of template matching, such as the techniques disclosed in Gavrila et al. (supra) and Oren et al., *Pedestrian detection using wavelet templates,* Proc. IEEE Conf. on Computer Vision and Pattern Recognition, pp. 193–199, 1997 for the detection of pedestrians in front of moving cameras. Humans can also be detected in image data by the detection of characteristics unique to humans, such as facial features and skin tones. Facial detection of humans is well known in the art, such as that disclosed in Turk et al., *Eigenfaces for recognition*, J. of Cognitive Neuroscience, 3(1): 71–86, 1991 and Bartlett et al., *Independent component representations for face recognition*, In Proc. of SPIE—Conference on Human Vision and Electronic Imaging, 2399:528–539, 1998.

When stationary cameras 102 are used, segmentation of objects of interest is usually obtained by background subtraction. First, a statistical model of the background is constructed at sub-module 202 for each camera 102. Then, foreground regions are detected at sub-module 204 by marking pixels that do not match the model (see Wren et al., supra). The extracted foreground regions are further analyzed to distinguish between people and other objects at sub-module 206, and also to fit body parts to the regions. Background subtraction methods that can properly handle many different variations in the background, such as moving curtains, flickering TV screens, or changes in illumination are well known in the art, such as that disclosed in Elgammal et al., *Non-Parametric Model for Background Subtraction*, Proc. European Conf. on Computer Vision, 2000; Stauffer et al., *Adaptive Background Mixture Models for Real-Time Tracking*, Proc. IEEE Conf. on Computer Vision and Pattern Recognition, II: 246–252, 1999; and Horprasert et al., *A Statistical Approach for Real-time Robust Background Subtraction and Shadow Detection*, Proc. Frame-Rate Workshop, 1999.

After the humans (or other objects of interest) are identified in the image data for the scene, the humans are tracked throughout the scene at sub-module 208. In many real-time systems that detect humans in every video frame, the tracking process is rather simple. Objects detected in successive frames are assumed to be the same if their corresponding image regions overlap. To deal with occlusions, more sophisticated methods that use shape, color, and intensity information have been developed, such as that disclosed in Darrell et al., *Integrated Person Tracking Using Stereo, Color, and Pattern Detection*, Intl. J Computer Vision, 37(2): 175–185, June 2000 and Isard et al., *A Bayesian Multiple-Blob Tracker*, Proc. Intl. Conf. Computer Vision, II: 34–41, 2001.

As discussed above, FIG. 2 presents an overview of the segmentation and tracking module. It is typically difficult to monitor an entire room (scene) with a single camera 102. Therefore, it is preferred that several stationary cameras 102 be placed at different locations. The cameras 102 are preferably positioned and oriented in such a way that they provide multiple views for the central part of each room (scene), but only a single view for the rest (such as corners). For each camera 102, a background model is built at sub-module 202 to facilitate the fast segmentation of foreground and background. In order to handle large moveable background objects, the background model is preferably modified to contain multiple-layers, so as to capture various states of the background. Previously, layered representations have mostly been used in motion segmentation, such as that disclosed in Weiss, *Smoothness in Layers: motion segmentation using nonparametric mixture estimation*, Proc. Conf. Computer Vision and Pattern Recognition, pp. 520–526, 1997; or in foreground tracking, such as that disclosed in Tao et al., *Dynamic Layer Representation with Applications to Tracking*, Proc. Conf. Computer Vision and Pattern Recognition, II: 134–141, 2000.

By maintaining layers in the background, pixel statistics can efficiently be transferred when a background object moves. To deal with local deformations of things such as furniture surfaces, a local search is added to the process of background subtraction. Once foreground pixels are identified, image segmentation and grouping techniques are applied at sub-module 204 to obtain a set of foreground regions. Each region is then classified as a human, a pet, or an object at sub-module 206, using the classification process described below. The classification preferably handles partial body occlusions and non-upright body poses. Pixels in object regions are then updated accordingly in the background model by signal 210. Simple position tracking is preferably used at sub-module 208, because the identities of individual people are not needed.

If more than one camera 102 is utilized, multi-camera reasoning is applied at sub-module 212 to combine foreground information from the various cameras 102. Camera calibration is preferably used to provide the reference frame in which observations from various view angles are integrated. Foreground regions extracted from individual camera viewpoint are mapped to the reference frame. When more than one observation of a human or an object is available, three-dimensional information is inferred at sub-module 214, which is then used for classifying the region.

The classification of humans and/or other objects in the image data performed at sub-module 206 will now be discussed in detail. The ability to differentiate among objects is fundamental for efficient functioning of the methods of the present invention. Examples of these objects include animate objects like people 106 and pets 108 and in-animate objects like doors, chairs, etc. The methods of the present invention preferably use a hierarchical scheme for generic object recognition based on Time-Delay Neural Networks (TDNN). The use of TDNN for recognition is well known in the art, such as that disclosed in Looney, *Pattern Recognition Using Neural Networks*, Oxford University Press, Oxford, 1997. Object recognition using computer vision is also well known in the art, such as that disclosed in Duda et al., *Pattern Recognition and Scene Analysis*, Wiley, New York 1973; Chin et al., *Model-based recognition in robot vision*, ACM Computing Surveys, 18(1): 67–108, March 1986; and Besl et al., *Three-dimensional object recognition*, Computing Surveys, 17(1): 75–145, March 1985.

Appearance based techniques have been extensively used for object recognition because of their inherent ability to exploit image based information. They attempt to recognize objects by finding the best match between a two-dimensional image representation of the object appearance against prototypes stored in memory. Appearance based methods in general make use of a lower dimensional subspace of the higher dimensional representation memory for the purpose of comparison. Common examples of appearance-based techniques include Principle Component Analysis (PCA), Independent Component Analysis (ICA), Neural Networks, etc.

In a preferred implementation of the methods and apparatus of the present invention, a generic object will be represented in terms of a spatio-temporal gradient feature vector of its appearance space. The feature vectors of semantically related objects are combined to construct an appearance space of the categories. This is based on the notion that construction of the appearance space using multiple views of an object is equivalent to that of using the feature vectors of the appearance space of each of that object. For animate objects the feature vectors are also constructed for the face space, since face information provides an accurate way to differentiate between people and other objects. Furthermore, the body posture of the individual under consideration is modeled, since for event detection and behavior analysis it is important to ascertain if the person is sitting, standing, or lying.

Instead of directly using image information, gradients are preferably used as a means for building the feature vectors. Since objects are preferably classified under various poses and illumination conditions, it would be non-trivial to model the entire space that the instances of a certain object class occupy given the fact that instances of the same class may look very different from each other (e.g. people wearing different clothes). Instead, features that do not change much under these different scenarios are identified and modeled. The gradient is one such feature since it reduces the dimension of the object space drastically by only capturing the shape information. Therefore, horizontal, vertical and combined gradients are extracted from the input intensity image and used as the feature vectors. A gradient based appearance model is then learned for the classes that are to be classified, preferably using an Elman recurrent neural network, such as that disclosed in Looney (supra).

Once the model is learned, recognition then involves traversing the non-linear state-space model, used in the Elman recurrent neural network, to ascertain the overall identity by finding out the number of states matched in that model space.

Thus, in summary, the preferred approach for object classification is as follows. Given a collection of sequences of a set of model objects, horizontal, vertical and combined gradients are extracted for each object and a set of image vectors corresponding to each object is formed. A recurrent network is built on each such set of image vectors and a hierarchy of appearance classes is constructed using the information about categories. The higher levels of the hierarchy are formed by repeatedly combining classes, as shown in FIG. 3. Given a sequence of the unknown object, the recognition error is computed with respect to the highest class. The recognition error with respect to all nodes is then computed at its intermediate lower level. If the recognition error at next level is higher than the recognition error at the current level, then the method stops, otherwise, the method proceeds to the node which has the lowest recognition error for which the recognition error computations are repeated.

Event Detection

Referring back to FIG. 1, the event detection is shown as module 116 for the analysis of the objects of interest detected and tracked in the image data and for the detection of a specific event relating to the objects of interest. The input to the event detection module 116 is both the video sequence from the cameras 102, plus the output of the segmentation and tracking module 114, which specifies for each detected object its position in the image (e.g., the center of mass), the bounding box (the bounding rectangle around the object), or the exact shape of the region corresponding to the object. This information is preferably updated in every frame as the person moves around the scene.

As discussed above, several specific events of interest are preferably selected, such as "fall down" or "stagger" and an event detection module is preferably provided for each such event. However, for purposes of this disclosure, it is assumed that a specific single event, such as a fall-down has been selected as the event of interest. The goal of the event detector module 116 is to process the data received from the tracking and segmentation module 114, extract more information, as needed, from the input image data, and to detect instances of when the specific event of interest happens. When the specific event of interest is detected, the information is preferably passed on to the control module 118, for further processing, such as notifying a central monitoring station (not shown).

As mentioned in the disclosure, additional features are preferably extracted from the image data and/or from the tracking data. The event detector module 116 scans the computed features and searches for specific predetermined criteria (e.g., patterns) indicating the specific event of interest. For example, for the fall-down event, the event detector 116 preferably searches for temporal sequence(s), motion characteristics, and/or trajectories that are predetermined to be indicative of a fall-down event.

With regard to the temporal sequence, the event detector module 116 preferably looks for a transition in the tracked object of interest from an upright pose to a lying pose. Since the object size and shape is determined in the segmentation and tracking module 114, the elongation of the shape can be easily measured to distinguish a standing person from a lying person. With regard to the motion characteristics, the event detector module 116 preferably looks for a fast, downward motion of the object of interest. This is preferably measured either by computing optical flow and evaluating its direction, or by utilizing a motion energy receptor that evaluates motion and gives high response when it detects downward motion. The velocity can also be obtained from the optical flow, or from the response of the motion receptor. The "smoothness" of motion can also be used, since, for instance, a falling person doesn't fall half way, then stops, and then continues falling. With regard to the trajectories, the event detector module 116 preferably looks for abruptness in the trajectory of the tracked object of interest. A real fall (as opposed to a person lying on the floor, e.g. to exercise) is in some sense unexpected and would result in abrupt changes in the person's trajectory.

To detect the specific event, such as the fall-down event, one, a combination of, or preferably all of these characteristics are used as a basis for the occurrence or likelihood of occurrence of the specific event. Preferably, a temporal sequence sub-module 120 is provided to look for upright to lying transitions, a motion characteristics sub-module 122 is provided to look for a fast, downward motion, and a trajectory sub-module 124 is provided to look for an abrupt trajectory change. The outputs of these sub-modules 120, 122, 124 are combined in any number of ways to detect the occurrence of the fall-down event. For example, each sub-module 120, 122, 124 could produce a number between 0 and 1 (0 meaning nothing interesting observed, 1 meaning that the specific feature was almost certainly observed). A weighted average is then computed from these numbers and compared to a threshold. If the result is greater than the threshold, it is determined that the specific event has occurred. Alternatively, the numbers from the sub-modules 120, 122, 124 can be multiplied and compared to a threshold.

Example sequences can be collected of people falling down, people lying down slowly, people simply moving around, etc. which are used to design and tune the combination of features from the sub-modules 120, 122, 124 to determined the weights at which the factors from the sub-modules are combined, as well as the arithmetic operation for their combination, and the threshold which must be surpassed for detection of the occurrence of the specific event of interest. Similar techniques can be applied to other events, for example staggering can be detected by looking for motion back and forth, irregular motion, some abruptness, but without significant changes in body pose.

Similarly, panic gestures can be detected by looking for fast, irregular motions, especially in the upper half of the body (to emphasize the movement of arms) and/or by looking for irregular motions (as opposed to regular, periodic motions). In this way panic gestures can be distinguished from other non-panic movements, such as a person exercising vigorously. The speed of motion can be detected as described for the fall-down event. The irregularity of motion can be detected by looking for the absence of periodic patterns in the observed motion. Preferably, a sub-module is used to detect periodic motions and "invert" its output (by outputting 1 minus the module output) to detect the absence of such motions.

As discussed above, the methods and apparatus of the present invention preferably look for specific predefined events, such as a "fall-down" event. While designing a specific detector module 116 for each event may be time-consuming, this approach is feasible when a limited number of selected events need to be recognized. Since there is no requirement for using the same set of image features for each event, this further simplifies the design process.

The methods of the present invention are particularly suited to be carried out by a computer software program, such computer software program preferably containing modules corresponding to the individual steps of the methods. Such software can of course be embodied in a computer-readable medium, such as an integrated chip or a peripheral device.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for detecting the occurrence of a specific event, the method comprising:
   capturing image data of a scene;
   detecting and tracking an object of interest in the image data;
   analyzing features of the object of interest;
   comparing the analyzed features wherein the detection preferably looks for abruptness in the downward trajectory of the tracked object of interest predetermined criteria indicative of the specific event; and
   determining whether the specific event has occurred based on the comparison, wherein the analyzing comprises analyzing a temporal sequence of the object of interest, a motion characteristics of the object of interest, and a trajectory of the object of interest.

2. The method of claim 1, wherein the specific event is selected from a list comprising a fall-down, stagger, and panic gesturing.

3. The method of claim 1, wherein the detecting comprises segmenting the image data into at least one moving object and background objects, the at least one moving object being the object of interest.

4. The method of claim 3, wherein the object of interest is a person and the detecting further comprises:
   learning and recognizing a human shape; and
   detecting a feature of the moving object indicative of a person.

5. The method of claim 4, wherein the detecting of a feature of the moving object indicative of a person comprises detecting a face on the moving object.

6. The method of claim 1, wherein the analyzing comprises analyzing one or more of a temporal sequence of the object of interest, a motion characteristics of the object of interest, and a trajectory of the object of interest.

7. The method of claim 6, wherein the specific event is a fall-down and the predetermined criteria indicative of the fall-down comprises at least one of:
   whether the temporal sequence indicates a transition from an upright pose to a lying pose for the object of interest;
   whether the motion characteristics indicates a downward motion within a predetermined time period for the object of interest; and
   whether there is an abrupt change in the trajectory for the object of interest.

8. The method of claim 6, wherein the specific event is a stagger and the predetermined criteria indicative of the stagger comprises at least one of:
   whether the temporal sequence indicates a back and forth motion for the object of interest;
   whether the motion characteristics indicates an irregular motion for the object of interest; and
   whether there is an some abruptness in the trajectory for the object of interest without significant changes in body pose.

9. The method of claim 6, wherein the specific event is a panic gesture and the predetermined criteria indicative of the panic gesture comprises at least one of:
   whether the temporal sequence indicates a periodic motion in a particular region of the object of interest; and
   whether the motion characteristics indicates a fast irregular motion in the particular region of the object of interest.

10. The method of claim 1, wherein the determining step comprises assigning a factor indicative of how well each of the analyzed features comply with the predetermined criteria indicative of the specific event and applying an arithmetic expression to the factors to determine a likelihood that the specific event has occurred.

11. A computer program product embodied in a computer-readable medium for detecting the occurrence of a specific event, the computer program product comprising:
   computer readable program code means for capturing image data of a scene;
   computer readable program code means for detecting and tracking an object of interest in the image data;
   computer readable program code means for analyzing features of the object of interest;
   computer readable program code means for comparing the analyzed features wherein the detection preferably looks for abruptness in the downward trajectory of the tracked object of interest predetermined criteria indicative of the specific event; and
   computer readable program code means for determining whether the specific event has occurred based on the comparison, wherein the analyzing comprises computer readable program code means for analyzing a temporal sequence of the object of interest, a motion characteristics of the object of interest, and a trajectory of the object of interest.

12. The computer program product of claim 11, wherein the detecting comprises computer readable program code means for segmenting the image data into at least one moving object and background objects, the at least one moving object being the object of interest.

13. The computer program product of claim 12, wherein the object of interest is a person and the detecting further comprises:
computer readable program code means for learning and recognizing a human shape; and
computer readable program code means for detecting a feature of the moving object indicative of a person.

14. The computer program product of claim 13, wherein the detecting of a feature of the moving object indicative of a person comprises computer readable program code means for detecting a face on the moving object.

15. The computer program product of claim 11, wherein the determining step comprises computer readable program code means for assigning a factor indicative of how well each of the analyzed features comply with the predetermined criteria indicative of the specific event and applying an arithmetic expression to the factors to determine a likelihood that the specific event has occurred.

16. A program storage device readable by machine, tangibly embodying a program of instructions executable by the machine to perform method steps for detecting the occurrence of a specific event, the method comprising:
capturing image data of a scene;
detecting and tracking an object of interest in the image data;
analyzing features of the object of interest;
comparing the analyzed features wherein the detection preferably looks for abruptness in the downward trajectory of the tracked object of interest predetermined criteria indicative of the specific event; and
determining whether the specific event has occurred based on the comparison, wherein the analyzing comprises analyzing a temporal sequence of the object of interest, a motion characteristics of the object of interest, and a trajectory of the object of interest.

17. The program storage device of claim 16, wherein the detecting comprises segmenting the image data into at least one moving object and background objects, the at least one moving object being the object of interest.

18. The program storage device of claim 17, wherein the object of interest is a person and the detecting further comprises:
learning and recognizing a human shape; and
detecting a feature of the moving object indicative of a person.

19. The program storage device of claim 18, wherein the detecting of a feature of the moving object indicative of a person comprises detecting a face on the moving object.

20. The program storage device of claim 16, wherein the determining step comprises assigning a factor indicative of how well each of the analyzed features comply with the predetermined criteria indicative of the specific event and applying an arithmetic expression to the factors to determine a likelihood that the specific event has occurred.

21. An apparatus for detecting the occurrence of a specific event, the apparatus comprising:
at least one camera for capturing image data of a scene;
a memory for storing predetermined criteria indicative of the specific event; and
a processor for analyzing the captured image data to:
detect and track an object of interest in the image data;
analyze a temporal sequence of the object of interest, a motion characteristics of the object of interest, and a trajectory of the object of interest;
compare the analyzed features wherein the detection preferably looks for abruptness in the downward trajectory of the tracked object of interest the predetermined criteria indicative of the specific event; and
determine whether the specific event has occurred based on the comparison.

22. A method for detecting the occurrence of a specific event, the method comprising:
capturing image data of a scene;
detecting and tracking an object of interest in the image data;
analyzing features of the object of interest;
comparing the analyzed features with predetermined criteria indicative of the specific event; and
determining whether the specific event has occurred based on the comparison, wherein the specific event is a stagger and the predetermined criteria indicative of the stagger comprises at least one of:
whether a temporal sequence of the object of interest indicates a back and forth motion for the object of interest;
whether a motion characteristic of the object of interest indicates an irregular motion for the object of interest; and
whether there is an some abruptness in a trajectory of the object of interest without significant changes in body pose.

23. A method for detecting the occurrence of a specific event, the method comprising:
capturing image data of a scene;
detecting and tracking an object of interest in the image data;
analyzing features of the object of interest;
comparing the analyzed features with predetermined criteria indicative of the specific event; and
determining whether the specific event has occurred based on the comparison, wherein the specific event is a panic gesture and the predetermined criteria indicative of the panic gesture comprises at least one of:
whether a temporal sequence of the object of interest indicates a periodic motion in a particular region of the object of interest; and
whether a motion characteristic of the object of interest indicates a fast irregular motion in the particular region of the object of interest.

* * * * *